June 3, 1969          D. E. ALTMAN          3,448,274

STRONGEST PHOTOSIGNAL SELECTION BY AN INHIBITING OR GATE

Filed Aug. 6, 1965

INVENTOR.
DANIEL E. ALTMAN

BY

ATTORNEYS

United States Patent Office 3,448,274
Patented June 3, 1969

3,448,274
STRONGEST PHOTOSIGNAL SELECTION BY AN INHIBITING OR GATE
Daniel E. Altman, San Diego, Calif., assignor to the United States of America as represented by the Secretary of the Navy
Filed Aug. 6, 1965, Ser. No. 477,986
Int. Cl. H01j 39/12, 5/16; G01j 1/20
U.S. Cl. 250—209                                      1 Claim

ABSTRACT OF THE DISCLOSURE

To improve the signal-to-noise ratio at the receiver of a laser beam point-to-point communication system, a number of apertures, each the size of the beam cross-section, are placed side-by-side in a grid as large as the greatest excursion of the beam. An inhibiting OR gate couples the photocell in each aperature to the ouput circuit to exclude all cell signals except the strongest signal.

---

The invention described herein may be manufactured and used by or for the Government of the United States of America for governmental purposes without the payment of any royalties thereon or therefor.

This invention relates to a point-to-point communication and particularly directed to such a system employing a coherent light beam.

In an optical receiver, of the type used for laser communications, a mask with an aperture is required in the focal plane of the receiving optics to reject background light arriving from directions other than that of the signal. Since background light constitutes noise in the signal channel, it is the object of all designs to increase signal-to-noise ratio by decreasing the ambient light. The degree to which background light can be rejected by the mask depends on how closely its aperture fits the spot of light formed by the received signal in the image plane. The degree to which the aperture can be made to fit the signal spot is limited by changes in spot size, and shape, and position of spot induced by atmospheric turbulence. Thermal disturbances continually defocus light beams to produce the well known "twinkle" of the distance point light source. It is apparent that if the aperture is made of a size that just fits the undistorted spot, any atmospherically induced change in the size, shape or location of the spot will result in a portion of the received light missing the aperture, with a resultant drop in the received signal-to-noise ratio. Amplitude changes of many decibels can be experienced. Heretofore compromise has been made between a small aperture with the resultant increase in signal strength variations caused by a moving beam, and using a large aperture with the resultant increase in signal strength variations caused by a moving beam, and using a large aperture with the resultant increase in background light and noise.

The object of this inventon is to provide an improved light beam receiving system.

The objects of this invention are attained by a stationary mask structure containing a plurality of side-by-side apertures throughout the area expected to be illuminated by the received beam. A separate light detector is placed behind each aperture and the output of each detector is connected into an exclusive OR circuit which permits one only of the detectors to feed a signal to the output circuit while blocking the signal from the remainder of the detectors. The ambient light is hence excluded from the output signal and the signal-to-noise ratio is kept high in spite of random deflections or motion of the beam across the mask.

Other objects and features of this invention will become apparent to those skilled in the art by referring to the preferred embodiment described in the following specification and shown in the accompanying drawings in which.

Figure 1:
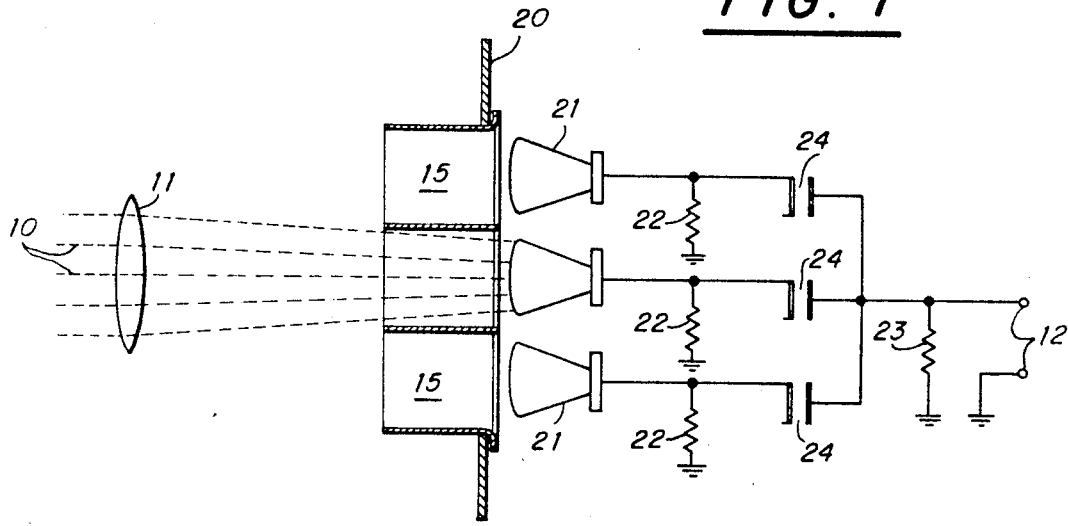
FIG. 1 is a circuit diagram of the detectors of this invention.
Figure 2:
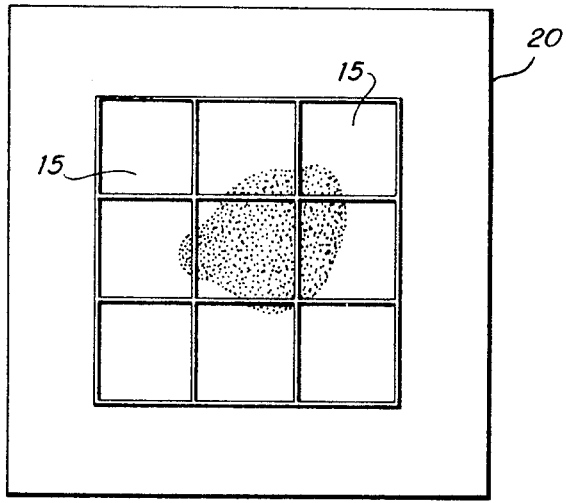
FIG. 2 is a plan view of the mask employed in the system of FIG. 1.

The light beam 10 is collimated and is received from a distant transmitter with focusing means for keeping the angle of the beam at a minimum. Contemplated is the laser or maser type of coherent light generator. It will be assumed that both the transmitter and receiver are on solid foundations and stationary, so that when the light beam is focused upon the receiver the only movement of the beam or change of shape will be caused by the intervening atmosphere. The optical system may be quite complicated or may comprise a single condensing lens 11. The message content of the beam will proudce an electrical signal at the output terminals 12.

The technique comprising this invention consists essentially of replacing the usual single aperture light receiver with an array of contiguous apertures 15 in the opaque board or mask 20. In the illustrated embodiment there are nine apertures arranged to cover the area expected to be covered by the excursions of the light spot. The optical system and the aperture size are selected so that the normal light spot size is approximately equal to the size of one aperture. Behind or in each of the apertures is placed, respectively, one of the photo tubes 21. Across the output terminals of each photo tube is connected the high resistance load device 22, one terminal of which is preferably grounded. Each photo tube output is connected, respectively, through the diodes 24 to load impedance 23. The logic of the circuitry shown at 22, 23 and 24 is that one photo tube having the greatest signal at any instant is the only photo tube connected aross the output 12.

In FIG. 1 the mask of separate photo detectors may comprise, if desired, commercially obtainable photo multipliers of the 931-type marketed by the Radio Corporation of America. Each photo detector develops across its load resistance 22 a voltage proportional to light power coming through its associated aperture. Now, according to an important feature of this invention, whichever of these resultant voltages is greatest at any instant of time is conductively connected to the output load resistance 23 through its conducting diodes 24. In the system shown a signal produes a negative voltage at the upper end of the connected load resistor 22.

In operation light from the field of view of the input lens is focused on the multi-aperture mask. The background light reaching each photo detector consists of the sum of light emanating from some particular area in the vicinty of the transmitter and light scattered by atmospheric haze. Usually the latter will predominate. Thus, in the absence of a signal the average difference between the amounts of light reaching individual detectors will ordinarily be very small. As long as the signal conrtibuted to the light reaching an individual aperture is greater than this small difference, the particular aperture encompassing the greaest portion of the signal spot will also be receiving the greatest total light. Hence the voltage across the load resistor or this particular photo detector will be the highest, which is most negative in the case of the photo multiplier tube shown. When the particular diode 24 connected to this voltage source conducts, essentially this same voltage appears across the output load resistor 23. Under these circumstances all the other diodes will be reverse biased and cut off so that the smaller signals do not contribute to he output. It follows that whichever aperture has the greatest signal and hence the greatest signal-to-background light ratio at any instant of time controls the output voltage.

In order that the best use be made of the available signal power in overcoming photo cell and circuits noise the individual apertures should be approximately the size of the undistorted signal spot. The area of the aperture array should be no larger than that required to encompass the maximum excursions of the signal spot so as to minimize the small possibility that the system be overcome by very intense sources of extraneous light in the field of view. Actual fabrication of the aperture mask is simple because the size of the image in the focal plane of the receiver can be made any convenient size by the use of suitable optics.

Many modifications may be made in the circuits of this invention without departing from the scope of the appended claim. For example the diode switching means 24 may be of the solid state or of the vacuum tube type. The photo cells 21 may be of any of the type yielding maximum signal in the particular spectrum of light employed in the beam 10.

What is claimed is:
1. A receiver for a light beam of given cross-sectional size and shape subject by atmospheric turbulence to random beam deflections, said receiver comprising;
  a stationary mask structure perpendicular to the direction of said light beam with a plurality of side-by-side apertures throughout the area expected to be illuminated by said beam during normal atmospheric deflections;
  a separate light detector in each aperture;
  a load impedance coupled to each detecor across which a voltage is generated which is a function of the level of illumination in the associated aperture;
  a common output impedance;
  diodes coupling said load impedances, respectively, across said output impedance so that forward current through one diode will back bias and cut off the remaining diodes.

References Cited

UNITED STATES PATENTS

| 2,885,564 | 5/1959 | Marshall | 250—213 |
| 2,982,859 | 5/1961 | Steinbrecher | 250—205 |
| 3,218,911 | 11/1965 | Bower et al. | 250—237 X |
| 3,319,080 | 5/1967 | Cornely et al. | 307—88.5 |

JAMES W. LAWRENCE, *Primary Examiner.*

C. R. CAMPBELL, *Assistant Examiner.*

U.S. Cl. X.R.

250—203, 208, 237; 313—96; 317—311